(12) United States Patent
Julien

(10) Patent No.: US 12,265,846 B2
(45) Date of Patent: Apr. 1, 2025

(54) METHOD AND COMPUTER FOR THE MANAGEMENT OF DATA EXCHANGES BETWEEN A PLURALITY OF TASKS

(71) Applicant: VITESCO TECHNOLOGIES GmbH, Regensburg (DE)

(72) Inventor: Michael Julien, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 573 days.

(21) Appl. No.: 17/763,418

(22) PCT Filed: Sep. 25, 2020

(86) PCT No.: PCT/EP2020/076962
§ 371 (c)(1),
(2) Date: Mar. 24, 2022

(87) PCT Pub. No.: WO2021/058773
PCT Pub. Date: Apr. 1, 2021

(65) Prior Publication Data
US 2022/0357986 A1    Nov. 10, 2022

(30) Foreign Application Priority Data
Sep. 27, 2019    (FR) ........................................ 1910711

(51) Int. Cl.
*G06F 9/48* (2006.01)
(52) U.S. Cl.
CPC .................................. *G06F 9/4881* (2013.01)
(58) Field of Classification Search
None
See application file for complete search history.

(56) References Cited

U.S. PATENT DOCUMENTS 6,704,628 B1 *  3/2004  Fennel ................ G06F 11/0757
                                                       180/404
6,951,019 B1 *  9/2005  Anderson ............ G06F 9/4825
                                                       718/102

(Continued)

FOREIGN PATENT DOCUMENTS

| FR | 3 065 550 | 10/2018 |
| FR | 3 071 334 | 3/2019 |
| WO | 2015/144488 | 10/2015 |

OTHER PUBLICATIONS

International Search Report for PCT/EP2020/076962 mailed Oct. 9, 2020, 6 pages.

(Continued)

*Primary Examiner* — Van H Nguyen
(74) *Attorney, Agent, or Firm* — NIXON & VANDERHYE

(57) ABSTRACT

Disclosed is a method of managing data exchanges between a plurality of tasks by a computer of a vehicle, in particular a motor vehicle, the method including a phase of grouping functions into sets, each set including data-producing functions and consuming functions. For each set of functions, a first phase includes the steps of executing the producing functions in order to produce what are referred to as "produced" data, and of storing a copy of each produced datum, and a second phase includes the steps of restoring the data to be consumed by the consuming functions, on the basis of the stored copies, and of executing the consuming functions on the basis of the restored data to be consumed.

20 Claims, 2 Drawing Sheets

(56) References Cited

U.S. PATENT DOCUMENTS

| | | | |
|---|---|---|---|
| 7,260,668 B2 * | 8/2007 | Franke | G06F 15/78 |
| | | | 709/212 |
| 9,280,389 B1 * | 3/2016 | Lipsio, Jr. | G06F 9/4881 |
| 9,910,701 B2 * | 3/2018 | Lipsio, Jr. | G06F 9/4843 |
| 2001/0049757 A1 * | 12/2001 | Liu | H04L 1/0043 |
| | | | 710/33 |
| 2006/0168587 A1 * | 7/2006 | Aslam-Mir | G06F 9/5066 |
| | | | 718/105 |
| 2011/0296431 A1 | 12/2011 | Gschwind et al. | |
| 2011/0314256 A1 * | 12/2011 | Callahan, II | G06F 8/45 |
| | | | 712/30 |
| 2013/0021360 A1 | 1/2013 | Gruber | |
| 2017/0147400 A1 | 5/2017 | Achouche et al. | |
| 2019/0087123 A1 | 3/2019 | Liljedahl | |

OTHER PUBLICATIONS

Written Opinion of the ISA for PCT/EP2020/076962 mailed Oct. 9, 2020, 7 pages.

* cited by examiner

METHOD AND COMPUTER FOR THE MANAGEMENT OF DATA EXCHANGES BETWEEN A PLURALITY OF TASKS

CROSS-REFERENCE RELATED TO APPLICATION

This application is the U.S. national phase of International Application No. PCT/EP2020/076962 filed Sep. 25, 2020 which designated the U.S. and claims priority to FR 1910711 filed Sep. 27, 2019, the entire contents of each of which are hereby incorporated by reference.

BACKGROUND OF THE INVENTION

Field of the Invention

The invention relates to the field of control of a vehicle engine, in particular a motor-vehicle engine, and more specifically to a method for managing data exchanges between a plurality of tasks implemented by a computer, and to a computer making it possible to implement this method.

Description of the Related Art

Nowadays, many vehicles are equipped with a plurality of actuators making it possible to implement the engine control functions of the vehicle, which functions are configured to ensure management of the operation of the engine. For example, the actuators can be a fuel injector, an engine-ignition system or even a system for recirculating gases in the engine. Each actuator is connected to an engine control computer in order to control it.

An engine control computer can be single-core or multi-core, that is to say it can include one or more cores, making it possible to implement the engine control functions. To this end, the one or more cores each execute a series of tasks according to a priority level, each task implementing one or more functions certain of which are data producers and/or data consumers.

When a first task, comprising at least one function that produces a datum, and a second task, comprising at least one function that consumes said datum, are implemented successively but in different execution periods, it is necessary to use a transition module in order to adapt the period of the signal corresponding to the produced datum so that this produced datum can be read by the consuming function of the second task. This transition module thus makes it possible to notify the computer of a change in the execution period and to transfer the data produced by the producing function to the consuming function.

It is also important to ensure the constancy of the data between the producing function and the consuming function, or, in other words, to protect the data transferred between the producing function and the consuming function, when these functions are implemented in separate tasks.

Constancy is defined by the stability and consistency of the data. A stability problem results in a modification of the value of a datum between several readings, or, in other words, between several restorations and consumptions of this datum. Thus, the functions that consume this datum will not all consume the same value of the datum: said value is seen as unstable.

A consistency problem arises when, for a data-consuming function, the set of data consumed by said consuming function comprises values which have not been modified simultaneously. Thus, the consuming function uses data that do not have the same timestamp and the data set is seen as inconsistent.

Thus, when there is a data-consistency problem, the executed consuming functions use data to be consumed that may prove to be incorrect. The use of incorrect data values by the consuming function can cause problems in the control of the operation of the motor, which will not have the expected behavior, or even damage the engine. Specifically, in the event of a consistency problem, the actual position of an actuator may differ from the position commanded by the associated computer. In such a case, the computer attempts to continuously correct this difference but convergence to the commanded position may never be reached, this possibly for example causing mechanical vibration effects that are detrimental to equipment and that make it more difficult to drive the vehicle.

In a first example, the computer is a so-called "preemptive" single-core computer, allowing the execution of so-called "preemptive" tasks. The preemptive single-core computer makes it possible to implement a first solution, making it possible to partially solve the consistency problem based on the priority level of each task. In other words, when a first task of a series of tasks is executed, it will be interrupted by the operating system if another task has a higher priority level. However, only data stability is ensured. As consistency is not checked, a protection mechanism must be added to the system to perform this check.

Moreover, in the case of a preemptive multicore computer, the consistency problem is due to the competitive execution of the tasks by the various cores.

In a second example, the computer is a so-called "cooperative" single-core computer, allowing the execution of so-called "cooperative" tasks. The cooperative single-core computer makes it possible to implement a second solution, also making it possible to partially solve the consistency problem. Specifically, at regular time intervals, the task being executed by the cooperative single-core computer is interrupted in order to let the operating system check that there is not another task the priority level of which is higher. If so, the task stops and lets this other task run. Just as before, problems with inconsistencies can occur in this cooperative model, since the operating system can introduce inconsistencies and instabilities.

The use of a cooperative multicore computer has drawbacks similar to those presented with regard to use of a cooperative single-core computer, or, in other words, use of a cooperative multicore computer allows only a partial solution of the data-consistency problem.

Thus, existing solutions only partially solve data-consistency problems. There is therefore a need for a solution making it possible to fully solve these drawbacks.

SUMMARY OF THE INVENTION

The invention relates to a method for managing data exchanges between a plurality of tasks by means of a computer of a vehicle, in particular a motor vehicle, said computer comprising at least one core, each task making it possible to execute at least one function, each function being designated as producing and/or consuming at least one datum, said method being noteworthy in that it comprises:
   a) a phase of grouping functions into sets, each set comprising data-producing functions, the execution of which is allocated to a given first task, and data-consuming functions, which consume data produced by said data-producing functions, the execution of which is allocated to a given second task different from the first task, b) for each set of functions:
  i) a first phase comprising the steps of:
    1) executing the data-producing functions of the set in order to produce what are referred to as "produced" data,
    2) storing a copy of each produced datum,
  ii) a second phase comprising the steps of:
    1) restoring the data to be consumed by the consuming functions of the set, on the basis of the stored copies,
    2) executing the consuming functions of the set on the basis of the restored data to be consumed.

Advantageously, the method according to the invention makes it possible to stabilize the produced data, so that they remain stable, or in other words unchanged, during their consumption by one or more functions, even if their production occurs between the start and the end of the execution of this function. Specifically, it is necessary to ensure the stability of the data in a number cases: when a given function reads a datum a number of times or when a number of successive functions read a given datum one or more times. In addition, the method according to the invention also solves consistency problems. The data to be consumed by a consuming function are all produced in such a way that competition between tasks cannot corrupt a portion of these data to be consumed. All of these data to be consumed are consistent at the moment when the consuming function is executed on the basis of these data to be consumed.

Preferably, the execution of the data-producing functions, in the first task to which the execution is allocated, is sequential.

Advantageously, a sequential execution of the producing functions makes it possible to avoid any problems with competition between tasks and thus to avoid any data-consistency problems.

Advantageously, the execution of the data-consuming functions, in the second task to which the execution is allocated, is sequential.

Advantageously, a sequential execution of the consuming functions makes it possible to avoid any problems with competition between tasks and thus to avoid any data-consistency problems.

Advantageously, in the storing step, the copies are stored in a memory comprising a plurality of regions, by assigning the value of each copy to one and only one region of the plurality of regions.

Advantageously, the step of storing in the memory makes it possible to freeze the value of the produced data.

Preferably, in the restoring step, the value of each copy stored in a region of the memory is respectively assigned to one datum to be consumed. Such a restoration, through storage mirroring, which might also be referred to as reading from write memory, makes it possible to copy the value of a stored datum to the datum to be consumed by the target function, that is to say the function intended to consume the datum during its execution.

Advantageously, the storing step and the restoring step make it possible to ensure the stability and consistency of the produced data, so that the data to be consumed, to which the values of the copy of each produced datum are assigned, remain stable and therefore unchanged before consumption by the consuming function.

The invention also relates to a vehicle, in particular motor-vehicle, computer for managing data exchanges between a plurality of tasks, said computer comprising at least one core, each task making it possible to execute at least one function, each function being designated as producing and/or consuming at least one datum, said computer being noteworthy in that it is configured to:

a) group functions into sets, each set comprising data-producing functions, the execution of which is allocated to a given first task, and data-consuming functions, which consume data produced by said data-producing functions, the execution of which is allocated to a given second task different from the first task, b) for each set of functions:
  1) execute the data-producing functions of the set in order to produce what are referred to as "produced" data,
  2) store a copy of each produced datum,
  3) restore the data to be consumed by the consuming functions of the set, on the basis of the stored copies,
  4) execute the consuming functions of the set on the basis of the restored data to be consumed.

Advantageously, the computer according to the invention makes it possible to stabilize the produced data, so that they remain stable, or in other words unchanged, during their consumption by a function, even if their production occurs between the start and the end of the execution of this function.

In addition, the computer according to the invention also solves consistency problems. The data to be consumed by a consuming function are all produced in such a way that competition between tasks cannot corrupt a portion of these data to be consumed. All of these data to be consumed are consistent at the moment when the consuming function is executed on the basis of these data to be consumed.

Preferably, the computer executes the data-producing functions, in the first task to which the execution is allocated, sequentially.

Advantageously, a sequential execution of the producing functions, by means of the computer, makes it possible to avoid any problems with competition between tasks and thus to avoid any data-consistency problems.

Preferably, the computer executes the data-consuming functions, in the second task to which the execution is allocated, sequentially.

Advantageously, a sequential execution of the consuming functions, by means of the computer, makes it possible to avoid any problem with competition between the tasks and thus to avoid any data-consistency problems.

Advantageously, the computer is configured to store a copy of each produced datum in a memory comprising a plurality of regions, by assigning the value of each copy to one region of the plurality of regions.

Advantageously, storing the data produced by the computer in the memory makes it possible to freeze the value of the produced data.

More preferably, the computer is configured to restore the data to be consumed by assigning the value of each copy stored in one region of the memory to a datum to be consumed.

Preferably, the produced data are stored and the data to be consumed are restored in the protection mechanism of the computer.

Advantageously, the computer makes it possible to ensure the stability of the produced data, so that the data to be consumed, to which the copies of the values of the produced data are assigned, remain stable before consumption by the consuming task.

The invention also relates to a vehicle comprising a computer such as presented above.

BRIEF DESCRIPTION OF THE DRAWINGS

Other features and advantages of the invention will become more apparent on reading the description which follows. This description is purely illustrative and must be read with reference to the attached drawings, in which.

DESCRIPTION OF THE PREFERRED EMBODIMENTS

Computer

Figure 1:
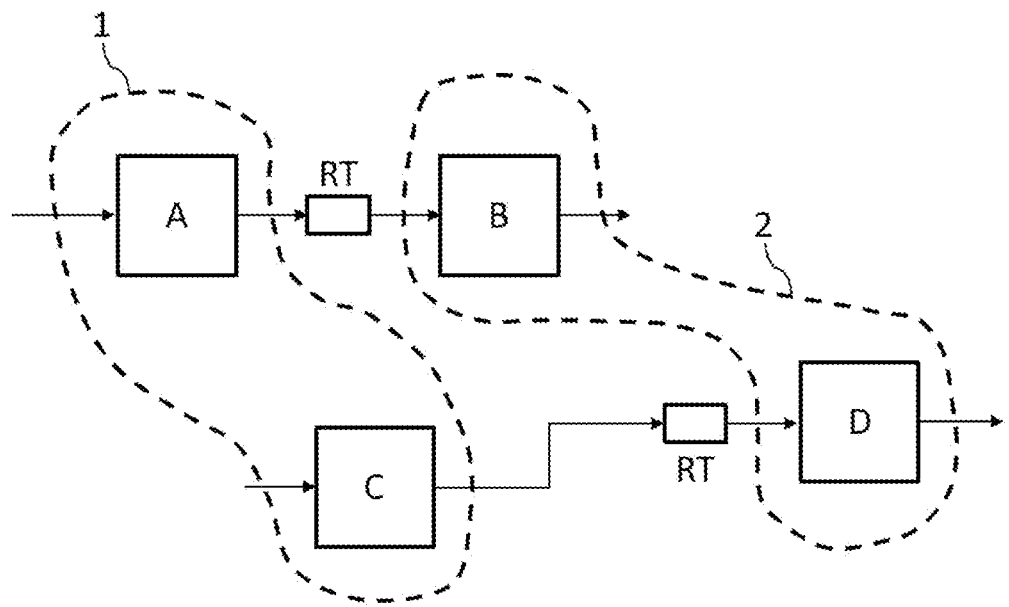
FIG. 1 shows an example of execution of a plurality of tasks by a computer according to the invention.

A computer for managing data exchanges between a plurality of tasks will now be described, said computer being intended to be mounted in a vehicle, in particular a motor vehicle, and configured to execute tasks, allowing a control function of the engine of said vehicle, such as ignition, fuel injection or gas recirculation, to be implemented by an actuator.

The computer comprises at least one core making it possible to execute at least one task comprising at least one function, in particular a function for computing and/or determining data. The computer also comprises a protection mechanism for protecting competition between the execution of various tasks.

Core

As explained previously, each core is in particular configured to execute a task, a plurality of independent tasks or a series of interdependent tasks which are allocated to it, via its operating system. Each task allows a sequence of one or more functions to be executed and is characterized by an activation scheme, an allocation scheme and a priority level.

The activation scheme of a task defines the type of activation of the execution of said task. The activation of the task can be synchronous, and therefore the period of execution of the task is constant, or asynchronous, and therefore the period of execution of the task is variable, or event-driven, or, in other words, after detection of a state of the system that requires the task to be executed.

The allocation scheme of a task defines the one or more cores to which said task is allocated. Specifically, a task can be executed on a single core or in a manner distributed between a plurality of cores.

The priority level of each task depends on the activation scheme and on the allocation scheme to one or more cores. For example, the priority level is defined depending on the execution period, and is inversely proportional to said execution period. In other words, in this example, the shorter the execution period of a task, the higher the priority level. There are obviously other ways of determining the priority level of each task.

The operating system makes it possible to choose, at any given time, which task must be executed and in what order, depending on the activation scheme of the tasks and their priority level.

Each function is said to "produce" and/or "consume" at least one datum. Specifically, each producing function is executed and makes it possible to determine one or more data, called "produced" data, and each consuming function is executed on the basis of one or more data, called data "to be consumed".

Moreover, each function is also characterized by its activation scheme and therefore by its execution period.

Protection Mechanism

The protection mechanism is configured to store a copy of the value of the data produced by a task and to restore data to be consumed by another task, on the basis of the stored copies.

Thus, the protection mechanism temporarily prevents competition between the tasks, and therefore temporarily stops the competition between the execution of each task during storage of the produced data and restoration of the data to be consumed.

In the present case, the protection mechanism comprises a transition module and a physical memory.

a) Transition Module RT

The transition module RT manages the transfer of data between competing tasks depending on the priority level of the tasks, in order to avoid any problems with competition between the execution of tasks. The management of the data transfer depends on the activation scheme, the priority level, and the allocation scheme, that is to say the core to which the task is allocated.

The transition module RT is configured to aggregate the transfer of data from the producing functions to the consuming functions via a function for storing the data produced by the producing functions and a function for restoring the data to be consumed by the consuming functions.

The transition module RT, via its storing function, makes it possible to determine the copy of a produced datum and is implemented to store this copy.

The transition module RT, via its restoring function, allows the data to be consumed to be determined on the basis of the value of a stored copy. In other words, the transition module RT is implemented to restore the data to be consumed.

b) Memory

The physical memory of the protection mechanism comprises a plurality of regions, making it possible to store the data produced by a task or by a series of tasks or by a plurality of independent tasks and to restore the data while ensuring consistency and stability.

According to other embodiments, the protection mechanism can for example consist of semaphores or queues or in imposing a forced sequentiality between the tasks.

Example 1

With reference to FIG. 1, a first example of execution of a plurality of producing and consuming functions A, B, C, D, will now be presented. In this example, the functions A and C are what are referred to as "producing" functions, and are executed in a first task 1, which is called the "source", the execution period of which is equal to 5 milliseconds, and the functions B and D are what are referred to as "consuming" functions, and are executed in a second task 2, called the "target", the execution period of which is equal to 10 milliseconds. The first task 1 and the second task 2, at 5 milliseconds and at 10 milliseconds, respectively, may be allocated to the same core or to a plurality of different cores.

The invention is not limited to any particular number of tasks, functions and cores.

The producing functions A and C are therefore executed sequentially in the first task 1 and the consuming functions B and D are also executed sequentially in the second task 2.

A single transition module RT is configured to aggregate the transfer of data from producing function A (producing function C, respectively) to consuming function B (consuming function D, respectively) via the storing function and the restoring function.

Example 2

Figure 2:
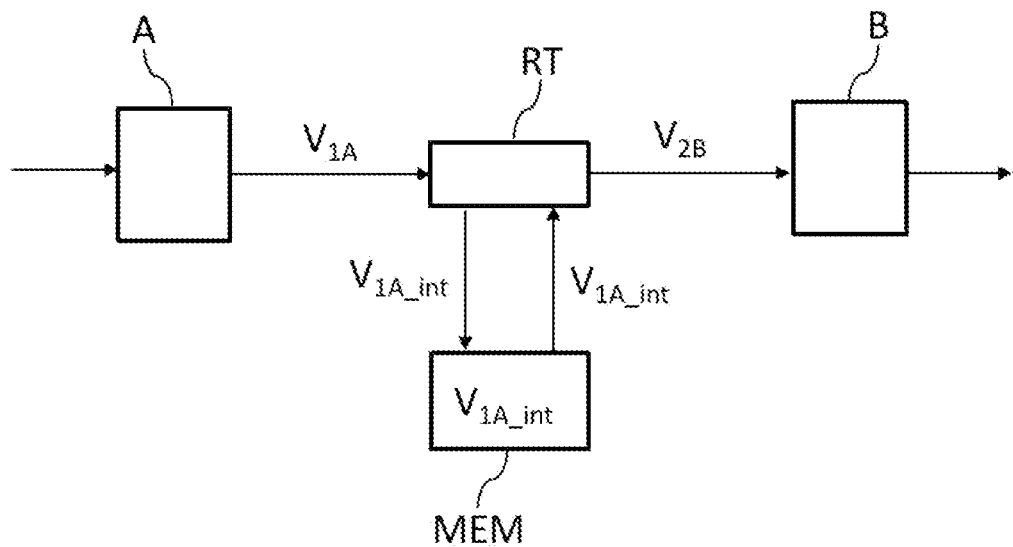
FIG. 2 illustrates a transition corresponding to the execution of two consecutive tasks by a computer according to the invention.

With reference to FIG. 2, a transfer of data from the first task 1 executing the producing functions A, C to the second task 2 executing the consuming functions B, D has been shown. To simplify the description, only transfer between the producing function A and the consuming function B which consumes the data produced by the producing task A will be described.

A transition module RT is connected between the first task 1 and the second task 2. In other words, the transition module RT connects the producing function A to the consuming function B, and the producing function C to the consuming function D.

As detailed previously in the first example, the first task 1 has an execution period equal to 5 milliseconds and the second task 2 has an execution period equal to 10 milliseconds. Thus, the first task 1 has a higher priority level than the second task 2. For this reason the producing function A is carried out before the consuming function B.

The producing function A is configured to be executed on the basis of an input value, which is for example defined by a device or a function external to the plurality of functions A, B, C, D, and makes it possible to determine a produced datum VIA after execution of the producing function A.

The transition module RT is configured to ensure the transfer of the datum VIA produced by the producing function A to the consuming function B. Thus, the transition module RT makes it possible to determine a copy $V_{1A\_int}$ of the produced datum $V_{1A}$ and to store this copy $V_{1A\_int}$.

The protection mechanism uses the memory MEM to store, or in other words to write, the copy $V_{1A\_int}$ to a region contained in said memory MEM.

The consuming function B is configured to read the datum $V_{2B}$ to be consumed, on the basis of the stored copy $V_{1A\_int}$, and to execute, on the basis of the datum $V_{2B}$ to be consumed.

Method

Figure 3:
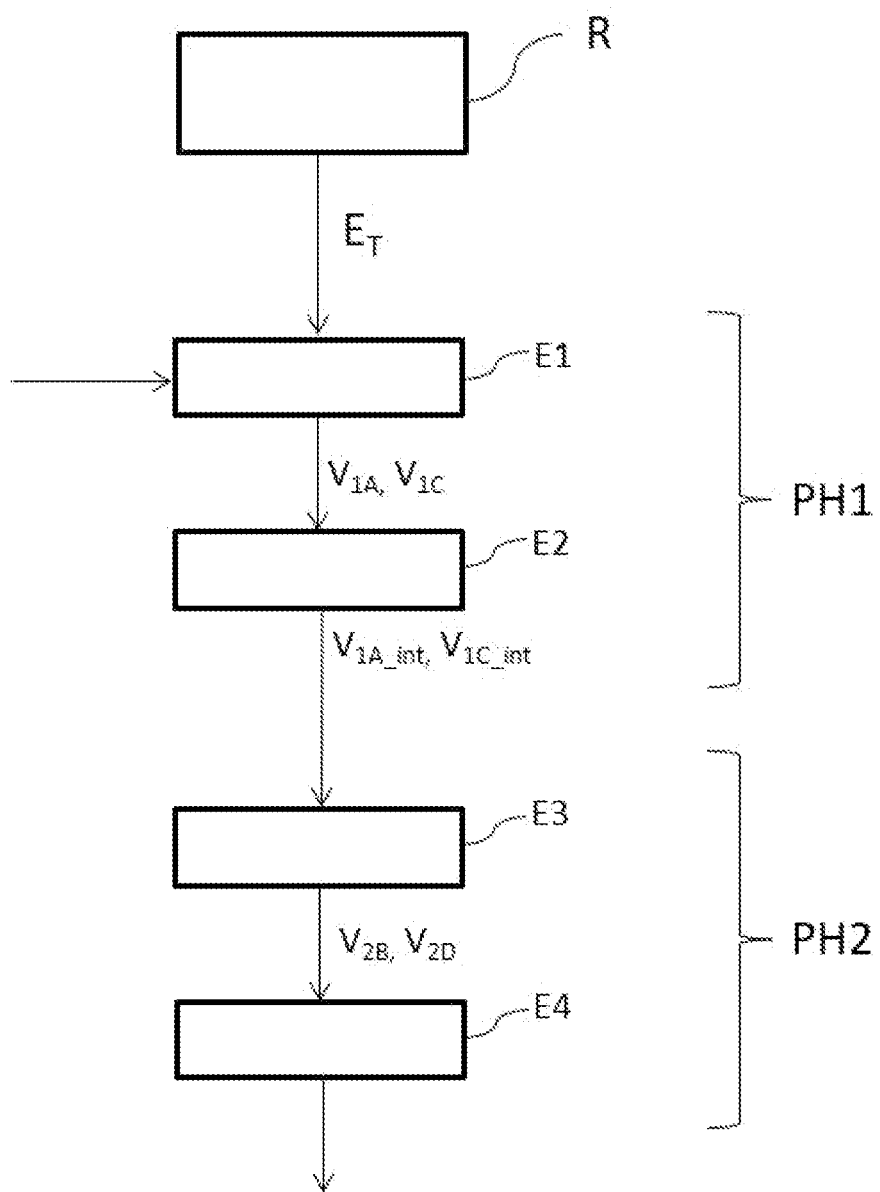
FIG. 3 shows an example of implementation of the task-managing method according to the invention.

With reference to FIG. 3, one embodiment of the method for managing data exchanges between a plurality of tasks by means of a computer such as presented above will now be described, in which embodiment the four functions A, B, C, D that were described with reference to FIG. 1 will be considered.

The method according to the invention first of all comprises a phase of grouping functions into sets $E_T$. Producing functions, which are executed in a given first task 1, and consuming functions, which consume the data produced by said producing functions, and which are executed in a given second task 2, are grouped together in each set $E_T$. In the example presented here, the set $E_T$ therefore contains the producing functions A and C, and the consuming functions B and D, which consume the data produced by said producing functions A, C.

Each producing function A and C can comprise a plurality of input values.

For each set $E_T$ of grouped functions, the method comprises a first phase PH1 comprising a step E1 of executing the producing functions A and C sequentially. In other words, the producing functions A and C are executed one after another. Producing function A is executed and makes it possible to determine a produced datum $V_{1A}$. Likewise, producing function C is executed and makes it possible to determine a produced datum $V_{2C}$.

Lastly, the first phase PH1 comprises a step E2 of storing the produced data $V_{1A}$ and $V_{1C}$, or, in other words, a step in which the produced datum VIA (the produced datum $V_{1C}$ respectively) is written by the transition module RT. The transition module RT allows, via its function for storing the produced data $V_{1A}$, $V_{1C}$, a copy $V_{1A\_int}$ of the produced datum $V_{1A}$ and a copy $V_{1C\_int}$ of the produced datum $V_{1C}$ to be determined, and said copies $V_{1A\_int}$, $V_{1C\_int}$ to be stored in the memory MEM.

The method also comprises a second phase PH2, carried out following the first phase PH1, comprising a step E3 of restoring the data $V_{2B}$, $V_{2D}$ to be consumed by the consuming functions B and D. In other words, the restoring function of the transition module RT makes it possible to assign the value of the copy $V_{1A\_int}$ (of the copy $V_{1C\_int}$, respectively) stored in the memory MEM, to the value of the datum $V_{2B}$ to be consumed (of the datum $V_{2D}$ to be consumed, respectively).

Such a restoration, through storage mirroring, which might also be referred to as reading from write memory, therefore makes it possible to copy the value of a datum stored in the memory MEM, here the value of the copy $V_{1A\_int}$ (of the copy $V_{1C\_int}$, respectively), to the datum $V_{2B}$ to be consumed (to the datum $V_{2D}$ to be consumed, respectively) by the consuming function B (the consuming function D, respectively) during its execution.

The second phase PH2 then comprises a step E4 of executing the consuming functions B and D of the set $E_T$ sequentially, on the basis of the restored data $V_{2B}$, $V_{2D}$ to be consumed. In other words, consuming function B is executed on the basis of the datum $V_{2B}$ to be consumed, and then consuming function D is executed on the basis of the datum $V_{2D}$ to be consumed.

Thus, the protection mechanism prevents simultaneous execution of the storing step E2 and restoring step E3, thus making it possible to freeze the value of the copies $V_{1A\_int}$, $V_{1C\_int}$. Thus, the stability of the value of copies $V_{1A\_int}$, $V_{2C\_int}$, which will then become the data $V_{1B}$, $V_{2D}$ to be consumed, is ensured.

However, the producing functions A, C and the consuming functions B, D can be executed simultaneously.

In the method presented above, the second phase PH2 is carried out after the first phase PH1. However, as a variant, it is possible for the second phase PH2 to be carried out before the first phase PH1, the consuming tasks being executed on the basis of data already stored or previously stored in the memory MEM, in an iteration carried out beforehand.

Stability and consistency of the data are ensured at the same time. Stability is ensured because each copy $V_{1A\_int}$, $V_{1C\_int}$ of the produced data $V_{1A}$ and Vic is stored only at the end of the execution of the producing functions A, C, and because restoration is carried out before the start of the execution of the consuming functions B, D.

Data consistency is ensured since the data are processed in an aggregated manner and sorted by set $E_T$ of producing functions A, C and of consuming functions B, D. Moreover, the method is automatable and realizable.

The invention claimed is:

1. A method for managing data exchanges between a plurality of tasks by means of a computer of a vehicle, said computer comprising at least one core, each task making it possible to execute at least one function, each function being designated as producing and/or consuming at least one datum, said method comprising:
- c) a phase of grouping functions into sets, each set comprising data-producing functions, the execution of which is allocated to a given first task, and data-consuming functions, which consume data produced by said data-producing functions, the execution of which is allocated to a given second task different from the first task,
- d) for each set of functions:
  - i) a first phase comprising the steps of:
    1) executing the data-producing functions of the set in order to produce what are referred to as "produced" data,
    2) storing a copy of each produced datum,
  - ii) a second phase comprising the steps of:
    1) restoring the data to be consumed by the consuming functions of the set, on the basis of the stored copies,
    2) executing the consuming functions of the set on the basis of the restored data to be consumed.

2. The method as claimed in claim 1, wherein, in the step of executing the producing functions, the execution of the data-producing functions in the first task, to which the execution is allocated, is sequential.

3. The method of claim 2, wherein, in the step of executing the consuming functions, the execution of the data-consuming functions in the second task, to which the execution is allocated, is sequential.

4. The method of claim 3, in the storing step, the copies are stored in a memory comprising a plurality of regions, by assigning the value of each copy to one region of the plurality of regions.

5. The method of claim 3, wherein, in the restoring step, the value of each copy stored in a region of the memory is respectively assigned to one datum to be consumed.

6. The method of claim 2, in the storing step, the copies are stored in a memory comprising a plurality of regions, by assigning the value of each copy to one region of the plurality of regions.

7. The method of claim 6, wherein, in the restoring step, the value of each copy stored in a region of the memory is respectively assigned to one datum to be consumed.

8. The method as claimed in claim 1, wherein, in the step of executing the consuming functions, the execution of the data-consuming functions in the second task, to which the execution is allocated, is sequential.

9. The method of claim 8, in the storing step, the copies are stored in a memory comprising a plurality of regions, by assigning the value of each copy to one region of the plurality of regions.

10. The method of claim 9, wherein, in the restoring step, the value of each copy stored in a region of the memory is respectively assigned to one datum to be consumed.

11. The method as claimed in claim 1, in the storing step, the copies are stored in a memory comprising a plurality of regions, by assigning the value of each copy to one region of the plurality of regions.

12. The method as claimed in claim 11, wherein, in the restoring step, the value of each copy stored in a region of the memory is respectively assigned to one datum to be consumed.

13. A vehicle computer for managing data exchanges between a plurality of tasks, said computer comprising at least one core, each task making it possible to execute at least one function, each function being designated as producing and/or consuming at least one datum, said computer being configured to:
- a) group functions into sets, each set comprising data-producing functions, the execution of which is allocated to a given first task, and data-consuming functions, which consume data produced by said data-producing functions, the execution of which is allocated to a given second task different from the first task,
- b) for each set of functions:
  1) execute the data-producing functions of the set in order to produce what are referred to as "produced" data,
  2) save a copy of each produced datum,
  3) Restore the data to be consumed by the consuming functions of the set, on the basis of the stored copies,
  4) Execute the consuming functions of the set on the basis of the restored data to be consumed.

14. The computer as claimed in claim 13, said computer being configured to execute the data-producing functions, in the first task to which the execution is allocated, sequentially.

15. The computer of claim 14, said computer being configured to execute the data-consuming functions, in the second task to which the execution is allocated, sequentially.

16. The computer of claim 14, said computer being configured to store a copy of each produced datum in a memory comprising a plurality of regions, by assigning the value of each copy to one region of the plurality of regions.

17. The computer as claimed in claim 13, said computer being configured to execute the data-consuming functions, in the second task to which the execution is allocated, sequentially.

18. The computer of claim 17, said computer being configured to store a copy of each produced datum in a memory comprising a plurality of regions, by assigning the value of each copy to one region of the plurality of regions.

19. The computer as claimed in claim 13, said computer being configured to store a copy of each produced datum in a memory comprising a plurality of regions, by assigning the value of each copy to one region of the plurality of regions.

20. A vehicle comprising a computer as claimed in claim 13.

* * * * *